(12) United States Patent
Ida et al.

(10) Patent No.: US 7,258,396 B2
(45) Date of Patent: Aug. 21, 2007

(54) VEHICLE ROOF DEVICE

(75) Inventors: Hiroyuki Ida, Okazaki (JP);
Katsutoshi Kato, Aichi-ken (JP);
Masaji Ishikawa, Toyoake (JP)

(73) Assignee: Aisin Seiko Kabushiki Kaisha,
Kariya-shi Aichi-ken, Tokyo ( * ) Notice: Subject to any disclaimer, the term of this patent is extended or adjusted under 35 U.S.C. 154(b) by 0 days.

(21) Appl. No.: 11/435,689

(22) Filed: May 18, 2006

(65) Prior Publication Data

US 2006/0261641 A1 Nov. 23, 2006

(30) Foreign Application Priority Data

May 23, 2005 (JP) .............................. 2005-149644

(51) Int. Cl.
*B60J 7/00* (2006.01)
(52) U.S. Cl. ............................................... 296/216.08
(58) Field of Classification Search ............ 296/216.08
See application file for complete search history.

(56) References Cited

U.S. PATENT DOCUMENTS 5,048,890 A * 9/1991 Masuda ................. 296/216.08
6,196,625 B1 * 3/2001 Nagashima et al. ........ 296/213
6,513,867 B1 * 2/2003 Bess et al. ............. 296/216.08

FOREIGN PATENT DOCUMENTS

JP 2000-185554 7/2000

* cited by examiner

*Primary Examiner*—Dennis H. Pedder
(74) *Attorney, Agent, or Firm*—Finnegan, Henderson, Farabow, Garrett & Dunner LLP

(57) ABSTRACT

A vehicle roof device includes a guide rail provided along a side edge of an opening portion formed at a vehicle roof, a frame provided at a rear portion of the opening portion so as to extend in a vehicle width direction, and the frame comprised layers of plural plates and fixed to the guide rail in a manner where one of the plates positioned at the top of the layers is fastened to the guide rail by caulking.

2 Claims, 4 Drawing Sheets

VEHICLE ROOF DEVICE

CROSS REFERENCE TO RELATED APPLICATIONS

This application is based on and claims priority under 35 U.S.C. § 119 to Japanese Patent Application 2005-149644, filed on May 23, 2005, the entire content of which is incorporated herein by reference.

FIELD OF THE INVENTION

The present invention relates to a vehicle roof device, in which a joint between a guide rail provided at a side edge of an opening portion formed at a vehicle roof and a frame provided at a rear portion of the opening portion is improved.

BACKGROUND

A known vehicle roof device disclosed in such as JP2000-185554 A is illustrated in FIG. 4. A basic configuration of the known vehicle roof device will be explained in accordance with FIG. 4. The known vehicle roof device includes guide rails 2, brackets 3, bolts 4, a frame 5 and caulking portions 6. Each of the guide rails 2 is provided at a vehicle roof 1 along a side of the opening portion and fixed to the bracket 3, which is provided at the side of the vehicle, by means of the bolt 4. The frame 5 made of a steel plate and extending in a vehicle width direction is provide at the rear portion of the opening portion in a manner where each end portion of the frame 5 is fixed to each guide rail 2 by means of the caulking portion 6. The frame 5 may be fixed to the guide rail 2 by means of welding or screwing.

In this configuration, because the frame 5 connects two guide rails 2 provided at the opening portion, chances that the roof deforms when an excessive load is applied to the vehicle, especially near the pillar, upon, for example a vehicle collision, have been reduced. Thus, the frame 5 is made of a steel plate having an appropriate thickness in order to reduce the chances of a deformation. The guide rail 2 is made of aluminum base alloy and formed by way of extrusion molding so as to include a groove 7 and a side groove 8. A shoe connected to a sunroof rid is provided within a groove 7 so as to be slidable in a front-rear direction of the vehicle, and a side edge of a sunshade is housed within the side groove 8.

As described above, the frame made of the steel plate is joined to the guide rail made of aluminum basic alloy by means of caulking, welding or a bolt. However, because the thickness of the frame needs to be set at an appropriate value in order to avoid its deformation, it has been considered that caulking is not an appropriate method for joining the frame to the guide rail. A need thus exist to provided the vehicle roof device whose frame can join to the guide rail by caulking.

SUMMARY OF THE INVENTION

According to an aspect of the present invention, a vehicle roof device includes a guide rail provided along a side edge of an opening portion formed at a vehicle roof, a frame provided at a rear portion of the opening portion so as to extend in a vehicle width direction, and the frame comprised layers of plural plates and fixed to the guide rail in a manner where one of the plates positioned at the top of the layers is fastened to the guide rail by caulking.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
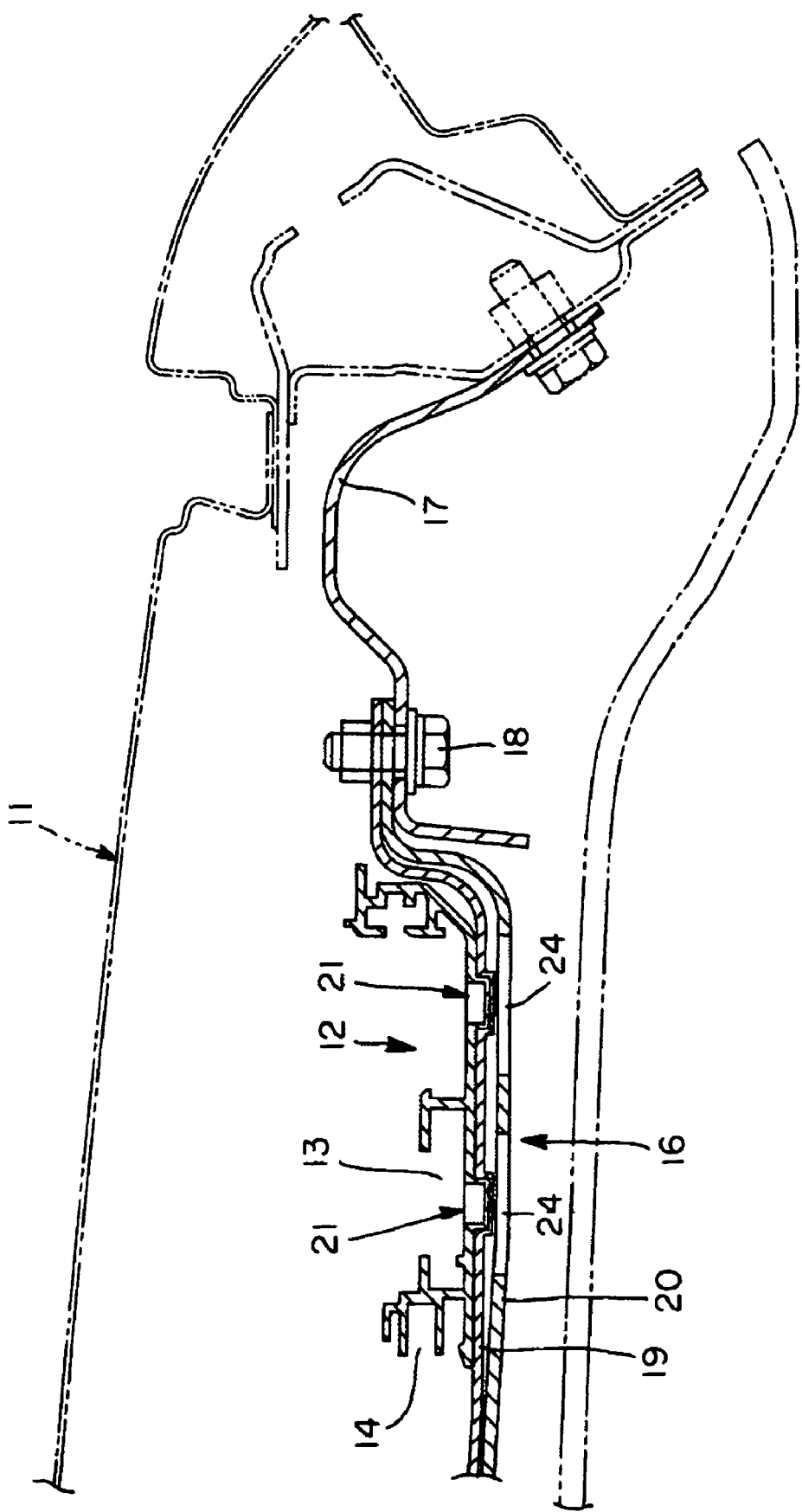
FIG. 1 illustrates a cross section indicating an example of the present invention.
Figure 2:
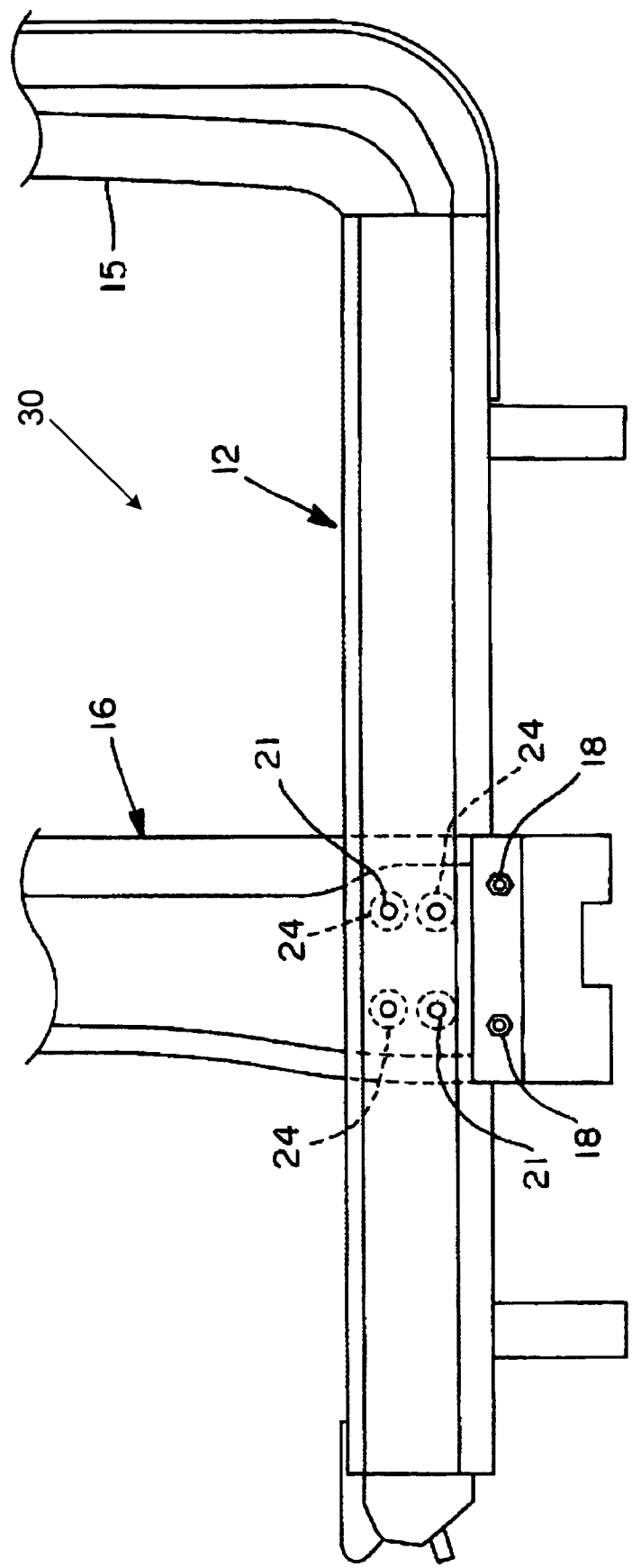
FIG. 2 illustrates a flat view indicating a fixing means between a rail and a frame.

A vehicle roof device according to the present invention will be explained in accordance with FIG. 1 and FIG. 2. FIG. 1 illustrates a cross section of the vehicle roof device indicating a right-half portion thereof seen from the rear of the vehicle, and a same configuration will be applied to a left-half portion of the vehicle roof device. A guide rail 12 is provided at a roof 11 along one side edge of an opening portion 30 in a manner where it extends in a front-rear direction of the vehicle. The guide rail 12 is made of aluminum alloy material by extrusion so as to have a regular cross sectional form as shown in FIG. 1. Specifically, the guide rail 12 includes a groove 13 for receiving a shoe of a sunroof rid and a side groove 14 within which a sunshade slides. A portion indicated with a numeral 15 in FIG. 2 is a front frame that supports an electric motor by which the shoe is moved in a front-rear direction and supports a cable.

The frame 16 (rear frame) connects the guide rail 12 provided at one side of the opening portion 30 to the other guide rail 12 provided at the other side of the opening portion 30 at the rear portion of the opening portion 30. Each end of the frame 16 is fixed to a bracket 17 provided at the vehicle by means of a bolt 18. The frame 16 is comprised of plural steel plates. In this embodiment, the frame 16 is comprised of two steel plates, a first plate 19 and a second plate 20. The first plate 19 is superposed on the second plate 20, and they are fixed together by means of spot welding. Specifically, thickness of the first plate 19 is set to a value that is appropriate for caulking, and the second plate 20 is provided in order to secure the strength of the frame 16. In this configuration, the first plate 19 is fixed to the guide rail 12 by caulking at caulking portions 21.

Figure 3:
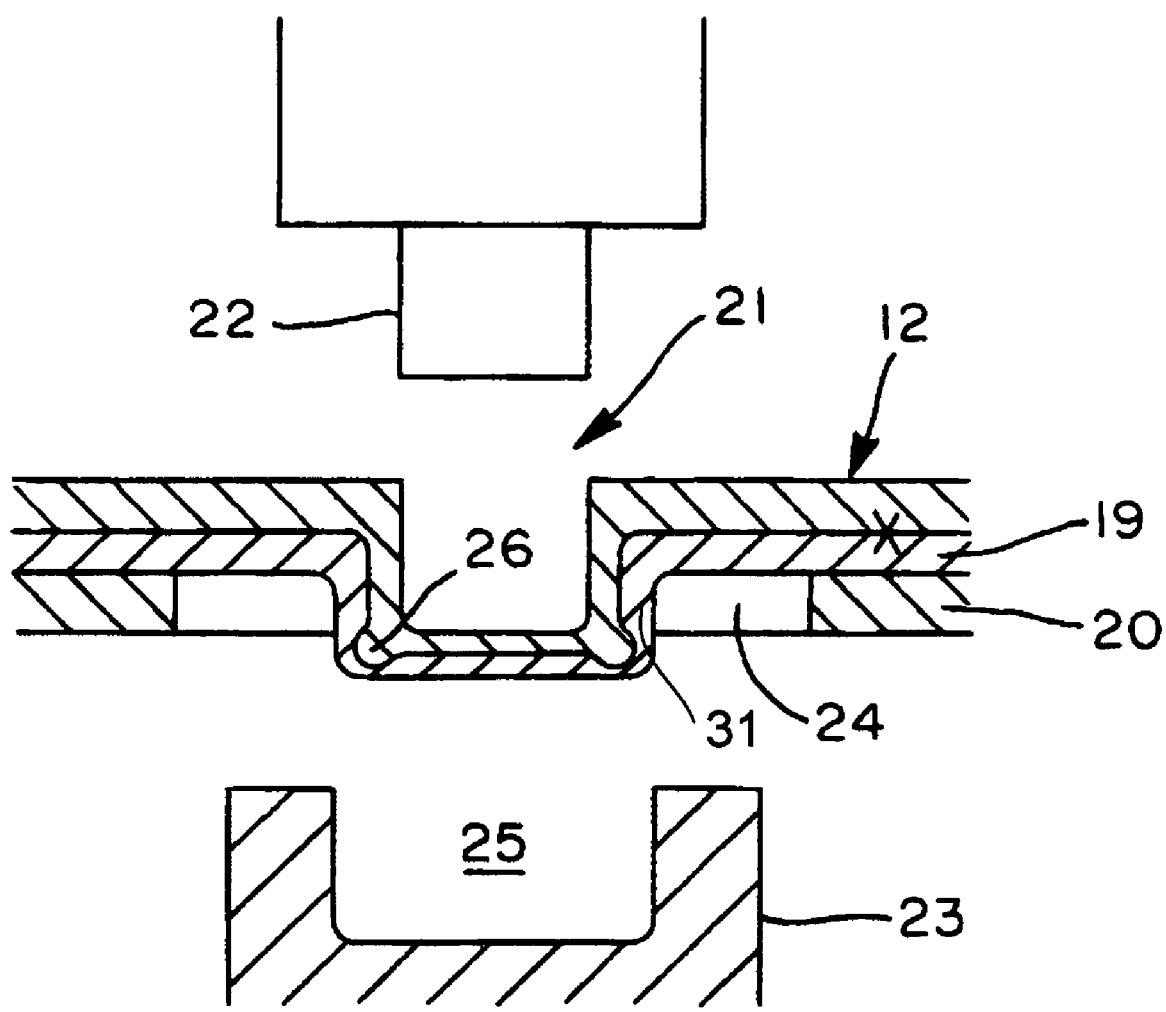
FIG. 3 illustrates a cross section indicating a caulking operation.
Figure 4:
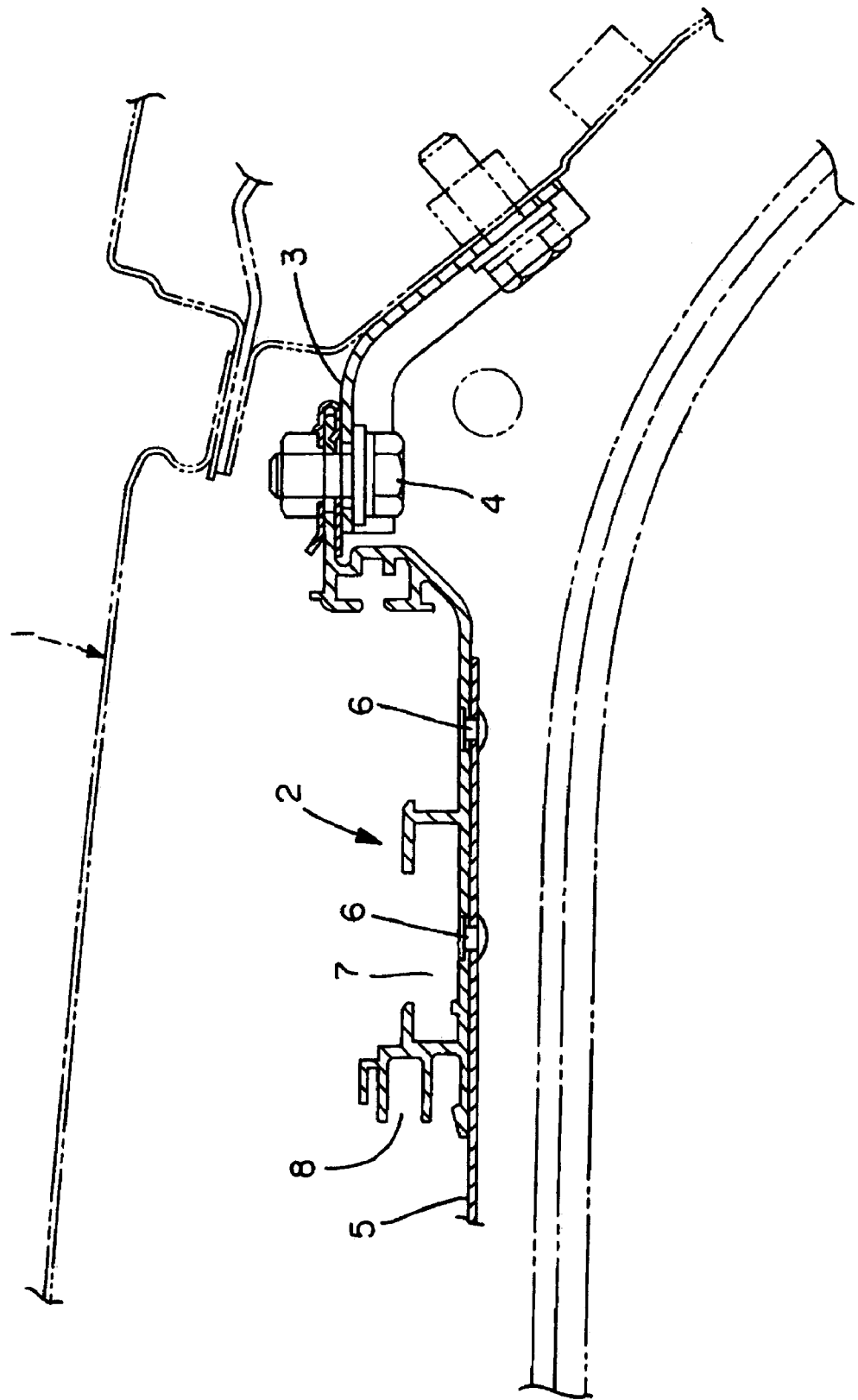
FIG. 4 illustrates a cross section indicating a known vehicle roof device.

The caulking operation will be explained more specifically in accordance with FIG. 3. The caulking operation is applied to the guide rail 12, the first plate 19 by use of dies comprised of the circular cylindrical convex die 22 and the concave die 23. The dies are positioned in a manner where the concave die 23 can contact the first plate 19 through each operation hole 24 formed on the second plate 20.

Drawing portions 31 are previously formed on the first plate 19 so as to fit to a concaved portion 25 of the concave die 23, and a ring shaped groove 26 is previously formed on a bottom edge of each drawing portions 31.

Thus, using the die 22 and the die 23, the first plate 19 is fixed to the guide rail 12 by means of, for example, TOX-rivet. In this embodiment, in order to enhance the level of strength between the aluminum alloy and the steal plate, the drawing portions 31 are formed on the first plate 19, however, the guide rail 12 may be fixed to the first plate 19 by caulking without forming any drawing portions 31.

When the drawing portions 31 are previously formed on the first plate 19, another ring-shape groove may be formed on the inner circumference of each drawing portion 31 in addition to the ring shape groove 26 so that the guide rail 12 penetrates into the groove taking advantage of ductility of the aluminum alloy.

In the embodiment of the present invention, the roof device is applied to the sunroof; however, it can be applied to a T-bar roof, a targa top roof or a convertible type roof.

The present invention provides a vehicle roof device including a frame comprised of plural steel plates, for example, a first plate and a second plate. More specifically, the present invention employs a technical method by which the first plate provided on the side of the guide rail is fixed to the guide rail by caulking, and the second plate is welded to the first plate.

The vehicle roof device to which the frame comprised of such plural steel plates is fixed by use of the abovementioned method reduces chances of deformation of the roof upon a vehicle collision.

According to the present invention, the frame of the vehicle roof device has an appropriate level of strength while the frame is fixed to the guide rail by caulking.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle roof device, comprising:
a guide rail provided along a side edge of an opening portion formed at a vehicle roof;
a frame provided at a rear portion of the opening portion so as to extend in a vehicle width direction; and
the frame comprising plural plates fixed together, a first plate being positioned above a second plate and fixed to the guide rail;
wherein a bracket is fixed at a side portion of the opening portion, and at least one of the plates of the frame is fastened to the bracket,
wherein, the guide rail is concaved so as to open toward a vehicle exterior, an operation hole is formed on the plate to which the guide rail is not fixed, and one of the plates is fixed to the guide rail by means of a deformable rivet.

2. A vehicle roof device comprising:
a guide rail provided along a side edge of an opening portion formed at a vehicle roof;
a frame provided at a rear portion of the opening portion so as to extend in a vehicle width direction;
the frame comprising plates, one of the plates being positioned above the other plate and fixed to the guide rail,
wherein a bracket is fixed at a side portion of the opening portion, and at least one of the plates of the frame is fastened to the bracket by means of a bolt; and
wherein the guide rail is concaved so as to open toward a vehicle exterior, an operation hole is formed on the plate to which the guide rail is not fixed, and the plate positioned above the other plate is riveted to the guide rail.

* * * * *

UNITED STATES PATENT AND TRADEMARK OFFICE
CERTIFICATE OF CORRECTION

PATENT NO. : 7,258,396 B2
APPLICATION NO. : 11/435689
DATED : August 21, 2007
INVENTOR(S) : Hiroyuki Ida et al.

It is certified that error appears in the above-identified patent and that said Letters Patent is hereby corrected as shown below:

Title Page, item (73), line 1, "Seiko" should read -- Seiki --.

Signed and Sealed this

Eighth Day of April, 2008

JON W. DUDAS
*Director of the United States Patent and Trademark Office*